United States Patent Office 3,427,526
Patented Feb. 11, 1969

3,427,526
INVERTER DRIVE SYSTEM
Andress Kernick, Lima, Ohio, assignor to Westinghouse Electric Corporation, Pittsburgh, Pa., a corporation of Pennsylvania
Filed Apr. 13, 1967, Ser. No. 630,559
U.S. Cl. 321—5          8 Claims
Int. Cl. H02m 7/00, 1/18; H02p 1/42

ABSTRACT OF THE DISCLOSURE

An inverter driven motor system wherein the inrush current must be limited in order to protect the power switching devices of the inverter from damage. The system as disclosed herein permits relatively large starting torques to be developed while limiting magnitude of the inrush current by holding substantially constant the ratio of the voltage applied to the inverter to the frequency of operation.

Background of the invention

The present invention relates to inverter drive systems and, more particularly, to inverter driven motor systems wherein the inrush current must be limited.

When an inverter utilizing power switching elements, such as transistors or silicon controlled rectifiers, is employed as the driving source for an alternating current motor, such as an induction motor, it is necessary that the inrush current supplied to the motor on startup be limited in order to protect the switching devices against damage. One technique method of holding the inrush current to a safe value is to reduce the voltage supplied by the inverter when the motor is being started. However, this has the serious disadvantage of developing very low start-up torque for the induction motor. Moreover, past methods suggested for reducing the voltage to the inverter have proven less than satisfactory. These techniques usually involve altering the conduction period of the switching devices to be less than the normal 180° of conduction, which results in high instantaneous peak currents appearing in the inverter, increasing the possibility of damage to the switching devices thereof.

Summary of the invention

Broadly, the present invention provides a new and improved inverter drive system for a rotating motor wherein: the ratio of the voltage supplied by the inverter to the frequency of operation is maintained constant so that during startup the voltage supplied and the frequency of operation are reduced so as to limit the inrush current to the rotating motor but yet permitting the development of relatively large startup torque.

Brief description of the drawings

FIG. 4 is a schematic-block diagram of the inverter drive apparatus of the present invention.

Description of the preferred embodiments

Figure 1:
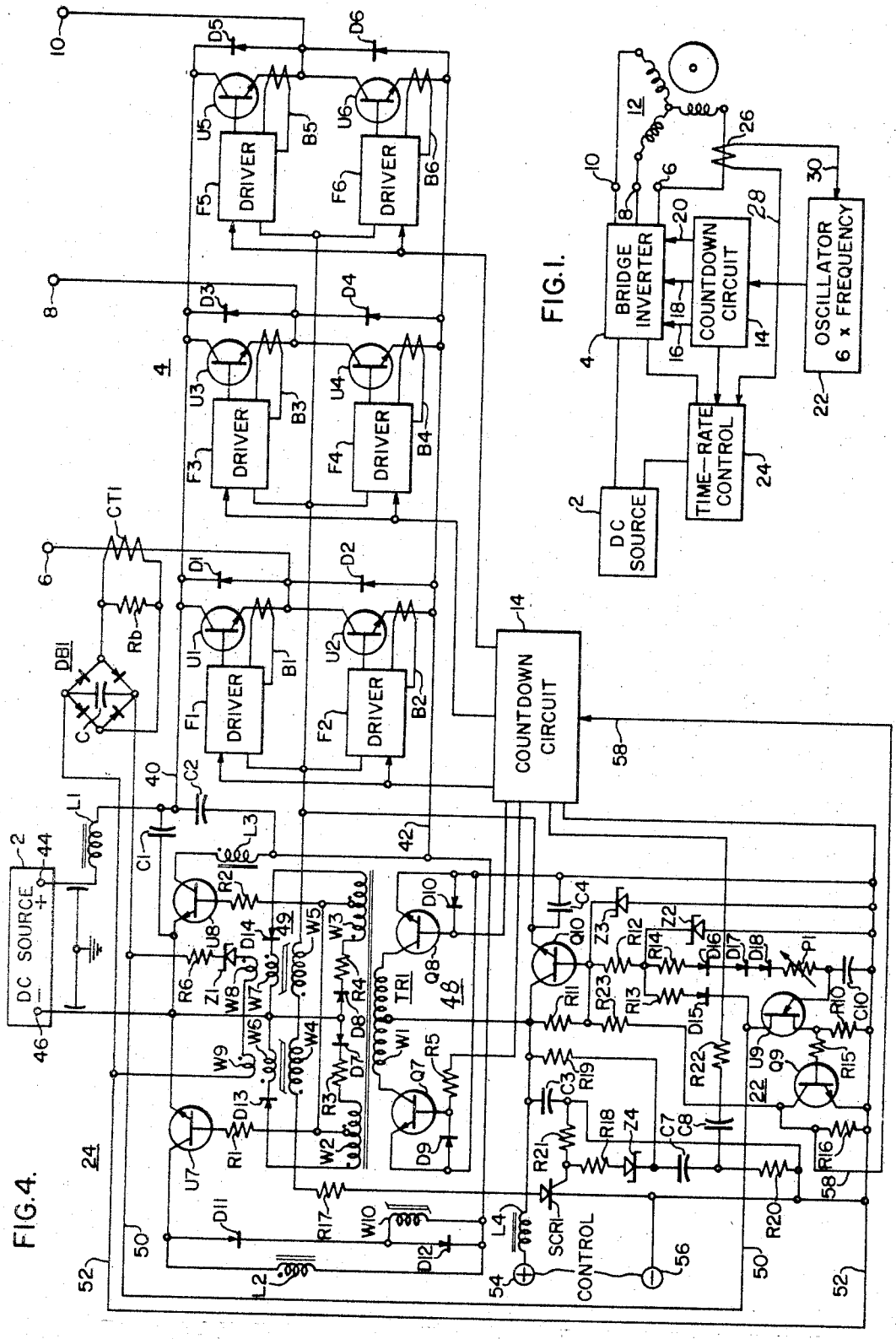
FIGURE 1 is a block diagram of the inverter drive apparatus of the present invention.
Figure 2:
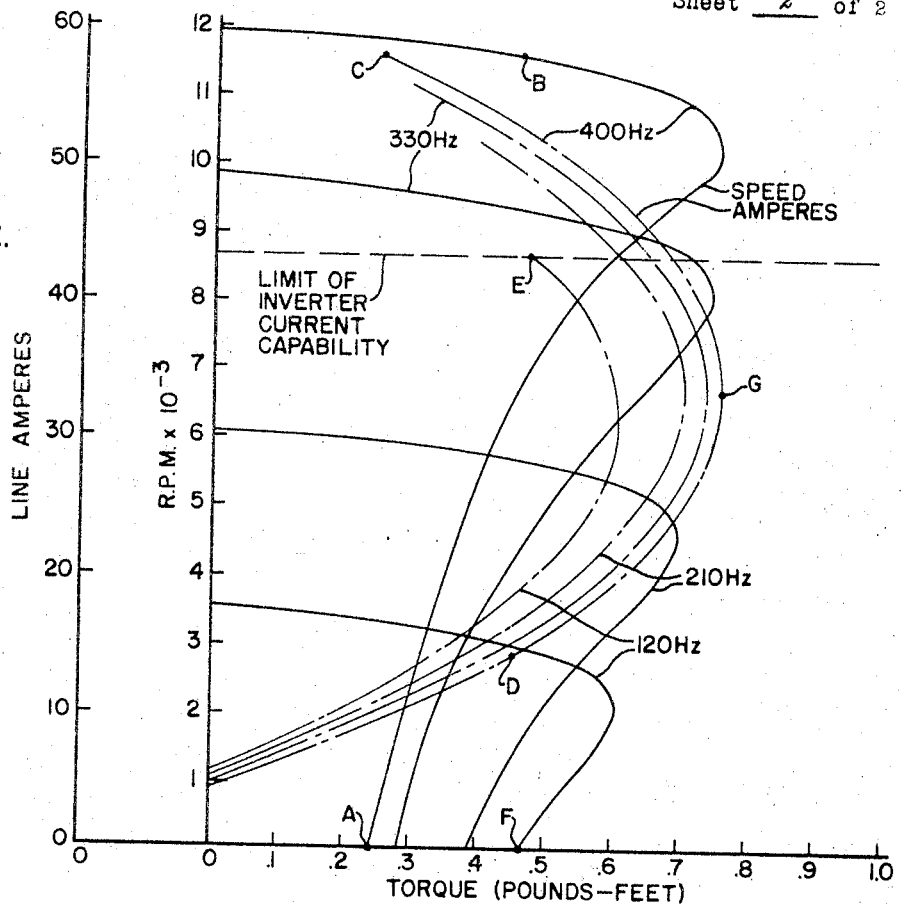
FIG. 2 is a plot of speed versus torque and line current versus torque for various frequencies of operation.

Referring now to FIG. 1 and the curves shown in FIG. 2, the mode of operation of the present invention will be described in reference thereto. Specific numerical designations are indicated in FIG. 2; however, it should be understood that this is done only for the purposes of ease and clarity in explanation. As a practical design limitation for inverters using solid state switching devices, such as transistors, it is necessary that the operating current supplied to the motor from the inverter be limited to three times the normal operating current. If one elects to limit the current to three times the normal operating current by reducing the applied voltage, a serious loss in starting torque will occur since the torque decreases inversely with the square of the voltage, assuming that frequency of operation is maintained constant. Accordingly, it is intended in the apparatus shown in FIG. 1 that the operating current be limited to 300% of normal operating current, while still providing a relatively high starting torque. This is accomplished by maintaining the ratio of voltage to frequency ($V/F$) constant throughout the startup of the motor to full speed.

In FIG. 1, the operating power for the system is provided by a DC source 2. This output is connected to a bridge inverter 4 which may comprise a well-known inverter configuration wherein power switching devices such as transistors are utilized to be gated on in a predetermined timed sequence to supply the three-phase alternating waveform at its output terminals 6, 8 and 10. The three-phase output of the bridge inverter 4 is supplied from the terminals 6, 8 and 10 to the respective windings of a three-phase induction motor 12 as shown schematically in FIG. 1. The gating pulses to gate on the power switching devices of the bridge inverter 4 are supplied by a countdown circuit 14 which has three outputs 16, 18 and 20. These outputs supply gating pulses to the respective legs of the bridge inverter 4 in order to gate on the switching devices thereof in a predetermined time sequence. The countdown circuit 14 is driven by an oscillator 22, which is indicated as having an output frequency which is six times the operating frequency of the inverter. That is, if the operating frequency is 400 Hz., the output of the oscillator 22 will be 6 times that or 2400 Hz. Connected between the DC source 2 and the bridge inverter 4 is a time-rate control 24 which controls the applied voltage to the bridge inverter 4. Thus, under the control of the time-rate control 24, the magnitude of voltage applied to the motor 12 by the bridge inverter 4 may be controlled thereby. Since it is necessary that the magnitude of the inrush current be limited to three times the normal operating current in the motor 12, it is necessary that both the time-rate control 24 and the oscillator 22 be controlled in order to maintain the constant $V/F$ ratio as previously discussed. To accomplish this, in FIG. 1, a feedback is provided via the current-transformer coupling 26 to the time-rate control 24 via an input 28 and to the oscillator 22 via an input 30. The time-rate control 24 is responsive to the current being supplied to the motor 12 so as to cause the applied voltage to the bridge inverter 4 from the DC source 2 to correspond thereto. It is also necessary that the oscillator 22 have its frequency output responsive to the current supplied to the motor 12 so as to increase or decrease the frequency thereof to maintain the $V/F$ ratio constant as required for the desired operation of the present system.

FIG. 2 shows four distinct pairs of constant $V/F$ characteristics for a typical induction motor. In this family of curves, the solid line curves indicate a plot of speed as a function of the torque, and the dotted lines curves indicate a plot of the line current as a function of the torque for the indicated frequencies of operation of 120, 210, 330 and 400 Hz. Significant points on these curves are indicated by capital letters. Point A on the 400 Hz. speed curve indicates the normal 400 Hz., 42 volt, AC line-to-line starting torque, which is shown to be approximately 0.24 pound-foot on the torque scale. Point A is associated with point C on the 400 Hz. current curve which defines the locked rotor starting current.. It can be seen from FIG. 2 that the point C is at a substantially higher current than the dotted line indicated as the "limit of the inverter current capability." Point B on the 400 Hz. speed curve indicates normal speed and torque and corresponds to the full load current defined by the point D on the 400 Hz. current curve.

Considering the 120 Hz. curves and particularly the speed curve at startup, the point F shows the starting torque at 120 Hz., 13 volts AC line-to-line to be .46 pound-foot as compared to the 400 Hz. starting point torque of 0.24 pound-foot. This shows that the starting torque for point F is approximately 90% higher than at the point A. Moreover, the corresponding locked rotor current represented by the point E on the 120 Hz. current curve is shown to be at the limit of inverter current capability and is approximately 25% lower than the constant-frequency inrush current at the 400 Hz. full-voltage value, as indicated by the point C.

A significant relationship exists between the points D and E in that there is a 3:1 ratio of line current therebetween. This means that there can be established, within the 300% current limitation of the inverter, 1.9 times as much starting torque at the motor at 120 Hz., 13 volts, line-to-line, as can be established by an infinite bus at 400 Hz., 42 volts line-to-line. From the above analysis it can be seen that increased starting torque, within the limit of inverter current capability, can be provided by maintaining a constant $V/F$ ratio, while reducing both the voltage and the frequency of operation at startup as shown by the 120 Hz. speed and current curves of FIG. 2.

In FIG. 1, the reduction of applied voltage is accomplished by the feedback control via the input 28 to the time-rate control 24 and the reduction in frequency is accomplished from the feedback input 30 to the oscillator 22. The reductions are made in accordance with a constant $V/F$ ratio. To provide operation on startup, the frequency and voltage are reduced once the current to the motor exceeds the full voltage pullout torque current, shown as the point G of the 400 Hz. current curve of FIG. 2. As the inrush current on starting the motor exceeds the point G value more and more, the frequency and voltage are reduced in response thereto limiting the current ceiling to the motor at startup such that the initial operating conditions result at points E and F in FIG. 2. As the motor starts up and increases in speed, the inrush current decreases, with operation of the motor following a current characteristic that traverses a frequency increase from 120 Hz. to 400 Hz. in a path between points E on 120 Hz. curve and point G on the 400 Hz. curve. Correspondingly, the speed curve traversal is from point F on the 120 Hz. curve to the pullout point on the 400 Hz. speed curve.

When the inrush current decreases below the G value, current continues to fall along 400 Hz. curve to the point D where full load current at normal speed is achieved corresponding to full load torque at the point B. During the described preparation, to reach the normal operating condition at the points D and B, the change in voltage to the motor is proportional to the change of frequency of operation, with the voltage returning to its full normal value once the G conditions of inrush current are reached. The voltage then remains full from the G to the D conditions where the speed-current-torque characteristics settle down to the normal operating points B and D on the 400 Hz. curves.

Figure 3:
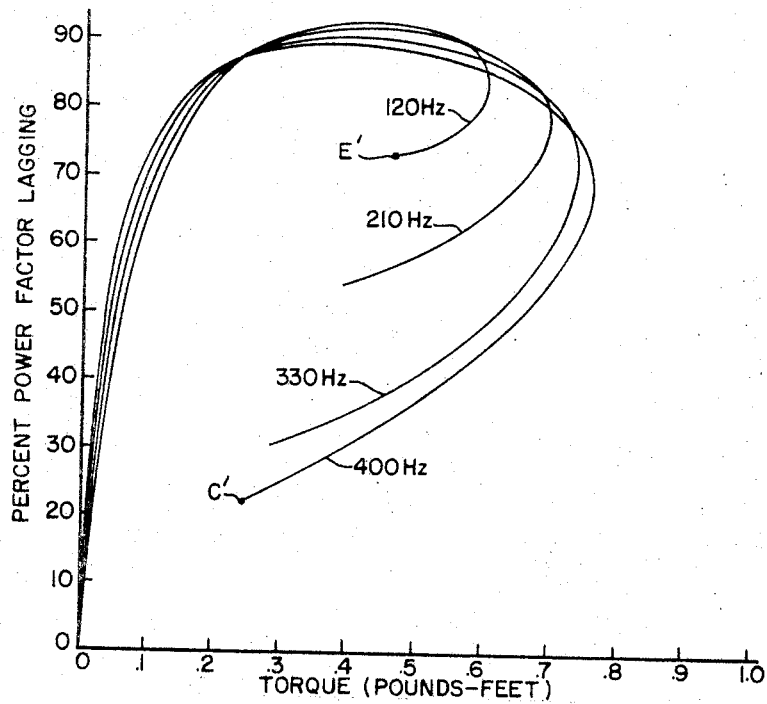
FIG. 3 is a plot of power factor versus torque for various frequencies of operation.

Variable speed with constant $V/F$ starting provides an important margin of safety through the inverter which is best illustrated in FIG. 3 which shows plots of power factor versus torque characteristics corresponding to the speed and current characteristics plotted in FIG. 2. From the curves in FIG. 3, it should be noted that the inverter switches at 73% power factor, indicated by the point E', when starting at 120 Hz., 13 volts, line-to-line, in comparison to switching at approximately 23% power factor point C' at 400 Hz. The effect is that the switching rate is not only reduced due to the low-frequency operation which increases the efficiency of the inverter, but also, the inverter switching at high power factor means that the current interruption in the power switching devices thereof occurs approximately at 68% of the peak value. In this way switching-cycle losses are reduced by an order of 7 times over that which occurs at 400 Hz., 0.23 power factor and 400% inrush current.

Referring now to FIG. 4, which is a schematic-block diagram of the circuitry of the present invention, special attention will be directed toward the circuitry for controlling the voltage supplied to the inverter bridge and the frequency of operation so as to maintain a constant $V/F$ ratio as described above. The bridge inverter 4 is shown as including transistors U1, U2, U3, U4, U5 and U6 connected in its standard bridge array. Diodes D1 through D6 are connected respectively across the transistors U1–U6 in reverse polarity thereto to provide a reverse current path through the inverter. Each of the power switching transistors U1–U6 is supplied by a driver F1–F6, respectively, which supplies turn-on pulses to the base electrodes of each of the transistors in response to signals being supplied from the countdown 14. Feedback is provided to the drivers F1–F6 via current feedback connections B1–B6, respectively, to establish proper drive level to the bases of the respective transistors U1–U2 in response to the current flowing in the collector-emitter circuits of the respective transistors U1–U6. An inverter which may conveniently be used with the present invention is shown in copending application Ser. No. 498,460, filed Dec. 1, 1966, by the present inventor, and assigned to the same assignee as the present application. The countdown 14 supplies the drive signals to the drivers F1–F6 to gate on the respective transistors U1–U6 at predetermined times so as to provide a three-phase alternating output at the output terminal 6, 8 and 10 of the inverter bridge. An analysis of countdown circuitry is found in: "Static Inverter With Neutralization of Harmonics," by Kernick, Roof, Heinrich, AIEE Transactions, Part 2 (Applications in Industry), volume 81, May 1962, pages 59–68.

A current transformer CT1 is coupled to output lead supplying the terminal 6. The current transformer CT1 thus senses the magnitude of current flowing to the terminal 6 and hence being supplied to the induction motor to be driven. A resistor $Rb$ is connected directly across the current transformer CT1 winding. A full wave rectifying diode bridge DB1 is also connected across the current transformer CT1 with a capacitor C1 being connected between the output points of the bridge. Considering first the operation of the time-rate control 24 which is used to control the voltage input to the inverter bridge between the input leads 40 and 42 thereof. The DC source 2 is connected across terminals 44 and 46, with the terminal 44 being connected through an inductor L1 to the lead 40. A capacitor C1 is connected between a line 40 and the negative terminal 46. A capacitor C2 is connected between the lines 40 and 42 with the voltage developed thereacross being supplied to the inverter bridge.

A chopper circuit including transistors U7 and U8 is provided for controlling the magnitude of voltage between the lines 40 and 42. The transistors U7 and U8 are essentially connected in parallel with the emitters being commonly connected and the collectors thereof coupled, respectively, through inductors L2 and L3 to line 42. Both of the transistors U7 and U8 are so controlled as to be in the same conductive condition at the same instant in time.

Under normal operating conditions when the motor is at normal current and torque, both the transistors U7 and U8 are saturated by continuous base drive supplied by an auxiliary oscillator 48 including the transistors Q7 and Q8 and the transformer TR1. The auxiliary oscillator 48 operates to supply a square-wave output. The collector electrodes of the transistors Q7 and Q8 are coupled to the primary winding W1 of the transformer TR1. The transformer TR1 includes secondary windings W2 and W3, with center-tap points on the windings W2 and W3 connected together and via resistors R1 and R2, respectively, to the base electrodes of the transistors U7 and U8. The emitter electrodes of the chopper transistors U7 and U8 are connected, respectively, through a diode D7 and a resistor R3 to the undotted end of the winding W2 and a diode D8 and a resistor R4 to the dotted end of the winding W3. The auxiliary oscillator 48 is slaved to a three-times basic frequency (1200 Hz.) output of countdown 14. A coupling resistor R5 is connected between one termination of three windings in series from countdown 14 (a phase-locked, square-wave voltage source of 1200 Hz.) and the base of transistor Q7. The other termination of three windings in series from countdown 14 connects to the base terminal of transistor Q8. Diodes D9 and D10, respectively, are connected between the emitter and base electrodes of the transistors Q7 and Q8. With transistors Q7 and Q8 having inputs from the countdown 14 to the base electrodes thereof, they are alternately conductive to provide a 1200 Hz. square-wave output.

A commutating diode D11 is provided for the chopper transistors U7 and U8 and is connected via its anode to the collector of the transistor U7. The cathode of the diode D11 is connected to the parallel combination of a diode D12 and a saturable reactor W10. The bottom end of the parallel combination is connected to the line 42. The diode D11 is selected to be of the fast recovery type. However, even such diodes require a finite time to recover following a forward conduction period. Therefore, the diode D12 and the saturable reactor W10 are utilized to act as current-limiting devices to limit the reverse current spikes which would otherwise be applied to the chopper transistors U7 and U8 each time the chopper turns on, which perhaps would cause damage thereto. Continuous 360° base drive is thus provided for transistors U7 and U8 from the auxiliary oscillator 48 through the paths for the base drives via the diode D7 and D8, respectively.

A magnetic amplifier 49 is provided which includes a pair of biasing windings W4 and W5 connected in series and to which is normally applied biasing current to maintain the magnetic amplifier 49 normally in its turned-off state. The magnetic amplifier 49 also includes a pair of gate windings W6 and W7, with the dotted end of the winding W6 connected via a diode D13 to the dotted end of the winding W2 of the transformer TR1 and the dotted end of the gate winding W7 connected via a diode D14 to the undotted end of the winding W3 of the transformer TR1. The diodes D13 and D14 are used in the magnetic amplifier 49 in an operating mode such that the circuit is of the self-saturating type. With the biasing windings W4 and W5 maintaining the magnetic amplifier 49 turned off in the normal state, voltage will be maintained across the windings W6 and W7 with the magnetic amplifier 49 supporting all volt-seconds. Under these conditions, both of the chopper transistors U7 and U8 will be supplied gate drive from the windings W2 and W3 of such a polarity continuity as to maintain these transistors in saturation. Thus, full output voltage is applied to the bridge inverter through the just described operation.

However, when abnormal current conditions exist at the output of the inverter, such as during startup of the motor, the current transformer CT1 will sense the excessive current, with a voltage being developed across the resistor R$b$ in response thereto. This voltage is applied to the diode bridge DB1 and rectified therein. A series circuit, consisting of a resistor R6, a Zener diode Z1 and a pair of turn-on windings W8 and W9, is connected across the output of the bridge DB1. The Zener diode Z1 is selected to breakover whenever an excessive voltage appears across the bridge DB1 in response to an excessive current. Breakover of the Zener Z1 applies turn-on current to the windings W8 and W9 such that opposing ampere-turns to those of the bias windings W4 and W5 are made. An electrical firing angle $\alpha_f$ is thereby established in magnetic amplifier 49 so that each output half-cycle is divided into an initial high-impedance portion followed by a low-impedance portion. The low impedance state of the gate windings W6 and W7 during their respective gating half-cycles following an angle $\alpha_f$ caused reverse bias to be applied across the base-emitter junctions of transistors U7 and U8 to thereby turn off these transistors. Thus, base-drive is applied to the transistors U7 and U8 from the center-taps of windings W2 and W3 during the high impedance state of the gate windings W6 and W7 in order to render transistors U7 and U8 conducting. During the low-impedance states of the gate windings W6 and W7, the center tap points on the windings W2 and W3 provide reverse biasing the transistors U7 and U8 which renders them nonconductive. At each succeeding half-cycle of the auxiliary oscillator, the magnetic amplifier 49 reverts momentarily to its initial high-impedance off state during which the transistors U7 and U8 are rendered conductive until the magnetic amplifier 49 again turns on at a firing angle $\alpha_f$ determined through the action of the control current applied to the windings W8 and W9 in opposition to the bias of windings W4 and W5. When a gate winding of magnetic amplifier 49 has fired again, transistors U7 and U8 are reverse-biased again. By the chopping action provided through the transistors U7 and U8, the voltage output of the inverter bridge 4 is decreased in response to the magnitude of an excess current being drawn as sensed by the current transformer CT1. When the inrush current reaches 300% of normal operating current, the voltage supplied to the inverter bridge may, for example, be reduced to 13 volts as compared to 42 volts at normal operating speeds. As the inrush current diminishes upon the starting up of the motor, the voltage also applied to the inverter bridge will be increased since the chopper transistors U7, U8 will be maintained conductive for longer portions of each half-cycle until full voltage conditions are reached when both of the transistors U7 and U8 are maintained in their saturated state for 180° of each half-cycle.

Considering now the frequency control required, the oscillator 22 in FIG. 1 includes a relaxation oscillator as shown in FIG. 4 having a unijunction transistor U9. The feedback voltage developed across the diode bridge DB1, in response to the output of the current transformer CT1, is applied to the unijunction U9 via a lead 50 connected at the second base of the transistor U9. From the other output point of the diode bridge DB1, a lead 52 is connected to the first base of the unijunction transistor U9 via a resistor R10 and to the emitter electrode thereof via a capacitor C10. A control source of direct current, not shown, is connected across a pair of terminals 54 and 56, the latter being connected to line 52. A series circuit is connected between terminals 54 and 56 including an inductor L4, a resistor R11, a resistor R12 and a Zener diode Z2. A Zener diode Z3 is connected between the junction of resistors R11 and R12 and the line 52. Under normal operating conditions with the motor at full speed, the voltage applied to the second base of the unijunction transistor U9 is supplied by the Zener diode Z2 through a resistor R13 and a diode D15, which has its cathode electrode connected to the line 50 and the second base of the unijunction U9. Under normal operating conditions, the capacitor C10 is charged from the constant source of voltage provided by the Zener diode Z2 and also the Zener Z3. A series circuit including a resistor R14 and diodes D16, D17 and D18 and a potentiometer P1 are connected between the cathode of the Zener diode Z2 and the emitter of the unijunction U9. When the capacitor C10 reaches a predetermined voltage at which the unijunction transistor U9 becomes conductive between the emitter and first base electrodes thereof, the capacitor C10 will discharge therethrough into a resistor R15 and the base of a transistor Q9 which is coupled to the first base of the unijunction U9 via the resistor R15. A resistor R23 is connected between the collector of the transistor Q9 and the resistor R11. An output pulse will thus be supplied at the collector of the transistor Q9 in response to the discharge of the capacitor C10, which is supplied to the countdown circuit via a lead 58. A load resistor R16 is connected between the collector and emitter electrodes of the transistor Q9. After the capacitor C10 has discharged and the unijunction transistor U9 has recovered, the capacitor C10 will again begin to charge from the constant voltage source determined by the Zener diode Z2 until it again reaches the predetermined value to turn on the unijunction transistor U9, and retrigger the transistor Q9 to provide an output via the lead 58 to the countdown 14. Thus, under normal operating conditions, pulses will appear at the collector of the transistor Q9 at a constant pulse repetition rate to trigger the countdown 14 in response thereto. The frequency rate can be adjusted via the potentiometer P1 so as to provide the desired six times the operating frequency output as explained above. Thus, for 400 Hz. operation the frequency for the relaxation oscillator including the transistors U9 and Q9 would be 2400 Hz.

The relaxation oscillator including the unijunction U9 and the transistor Q9 will continue to operate normally until a critical condition is reached at the output of the inverter bridge. The critical condition may be set to be when the current has exceeded 235% (point G in FIG. 2) of the full-load operating current for the motor. This would be sensed in the current transformer CT1 and appears as a higher voltage across the bridge DB1. This higher voltage is applied via the lead 50 to the cathode of the diode D15 and the second base of the unijunction transistor U9. The voltage at the second base of the unijunction U9 is thus raised to a value higher than its normal voltage as supplied from the constant voltage source via the diode D15. Thus, it will be necessary that the capacitor C10 charge to a higher voltage in order to reach the necessary percentage of the base-to-base voltage of the unijunction U9 in order to cause the unijunction U9 to fire between emitter and first base thereof. Accordingly, the time between the discharges of the capacitor C10 via the unijunction U9 to pulse the transistor U9 is decreased causing pulses at a lower pulse repetition rate to be applied via the lead 58 to the countdown 14. As a result of this, the transistors U1-U6 of the inverter bridge are gated on at a lower rate and the output frequency of the inverter is thus lowered. The increase in voltage appearing at the base 2 of the unijunction U9 during the critical period, for example, during startup of the motor, determines the decrease in frequency output of the inverter. As desired, the frequency rate may be decreased to 120 Hz. in starting up to obtain the advantages of limiting the inrush current to 300% and also to provide increased startup torque over that obtained at 400 Hz.

The startup operation of the circuitry will now be described. A thyristor SCR1 is utilized to act as a static starting relay which is a time delay to insure that the circuitry starts up under desirable conditions. The anode of SCR1 is connected through a resistor R17 to the dotted end of the bias winding W4. Thus bias is not initially applied to the bias winding W4 and W5 until the SCR1 is fired; therefore, the magnetic amplifier 49 acts as a shunting device for the chopper including the transistors U1 and U7, and the transistors U7 and U8 are initially turned off. A capacitor C7 which has one end connected to the gate electrode of the controlled rectifier SCR1 via a Zener diode Z4 and a resistor R18. The capacitor C7 charges through a resistor R19 from the control source at terminal 54. A resistor R20 is connected to the bottom end of the capacitor C7 and the line 52, and a resistor R21 is connected between the gate electrode of SCR1 and the negative terminal 56. The delay time on startup ends when the voltage across the resistor R20 and the capacitor C7 breaks down the Zener diode Z4 to supply a turn-on pulse to the gate electrode of the thyristor SCR1. Conduction of thyristor SCR1 provides biasing current to the biasing windings W3 and W4 of the magnetic amplifier 49, which turns off the magnetic amplifier and permits base drive to be supplied to the chopper transistors U7 and U8.

A series circuit including a resistor R22 and a capacitor C8 is connected between an output of the countdown 14 and the junction of the capacitor C7 and the resistor R20. The reason for this is that the resistor R19 must be selected to have a relatively large resistance value in order to provide sufficient time delay and utilize a relatively small, temperature-stable and low-leakage capacitance for the capacitor C7. Therefore, charging current through resistor R19 may be insufficient to fire thyristor SCR1. Therefore, an output from the countdown 14 is utilized, which for example may be derived in response to the conduction of one of the transistors thereof, to provide a periodic low impedance spike to the capacitor C7 charging voltage, so that, when the capacitor C7 has reached the firing voltage by means of the high impedance resistor R19, sufficient current will be supplied to the controlled rectifier SCR1 to turn it on and thereby complete the start-up time delay.

With the transistors U7, U8 being biased on, the voltage begins to the applied to the motor at the normal operating frequency through the bridge inverter 4. As the voltage builds up, however, the inrush current soon exceeds the limiting value which is sensed by the current transformer CT1 and applied to the diode bridge DB1. As previously explained, operation of the circuitry of FIG. 4 causes both the frequency and the voltage to be decreased according to a nearly constant $V/F$ ratio. The component values for the frequency and voltage reduction are so selected that the constant $V/F$ ratio is maintained throughout starting until full voltage and frequency is reached when the motor is operating at or below pull-out current.

A control power supply is also provided for supplying operating voltage in the circuit of FIG. 4 and includes the inductor L3, a capacitor C3, a transistor Q10 and a capacitor C4, for translating power therethrough to the other elements of the circuitry.

Although the present invention has been described with a certain degree of particularity, it should be understood that the present disclosure has been made only by way of example and that numerous changes in the details of construction of the combination and arrangement of parts and elements can be resorted to without departing from the spirit and scope of the present invention.

What is claimed is:
1. In an inverter drive system for supplying an alternating output to a motor, the combination of:
 a direct current source;
 inverter means for converting the DC output of said direct current source to said alternating output;
 voltage control means for controlling the DC voltage output of said source to be applied to said inverter means;
 frequency control means for controlling the frequency of said inverter means; and
 feedback means responsive to the current output of said inverter means above a predetermined value and being operative to control said voltage control means and said frequency control means to that the ratio of the alternating voltage output of said inverter means and said frequency of operation of said inverter means is maintained substantially constant to limit said current output to said predetermined value.

2. The combination of claim 1 wherein:
 said voltage control means being operatively connected between said direct current source and said inverter means, and
 said feedback means operatively connected between the output of said inverter means and said voltage control means and said frequency control means.

3. The combination of claim 2 wherein:
 said voltage control means including,
 a chopper circuit for interrupting the output of said direct current source to reduce said voltage output to be applied to said inverter means in response to the current output of said inverter means exceeding said predetermined value.

4. The combination of claim 2 wherein:
said frequency control means including,
an oscillator circuit for reducing the operating frequency of said inverter means in response to the current output of said inverter means exceeding said predetermined value.

5. The combination of claim 4 wherein:
said voltage control means including,
a chopper circuit for interrupting the output of said direct current source to reduce said voltage output to be applied to said inverter means in response to the current output of said inverter means exceeding said predetermined value.

6. The combination of claim 3 wherein:
said chopper circuit including,
a pair of transistors operatively connected in parallel between said direct current source and said inverter means,
a driving source for supplying drive current to said pair of transistors when said current output is below said predetermined value to saturate both of said pair of transistors,
a reference device for providing a signal when said current output exceeds said predetermined value, and
a magnetic amplifier responsive to said signal from said reference device to effect the turn off of said pair of transistors for a given period of time in response to said current output exceeding said predetermined value.

7. The combination of claim 4 wherein:
said oscillator circuit comprising,
a relaxation oscillator including,
a unijunction transistor having a plurality of electrodes and operative to provide a conductive path between a first pair of electrodes when the voltage therebetween reaches a predetermined proportion of the voltage between a second pair of electrodes,
a capacitor operatively connected across said first pair of electrodes,
a reference source of potential for charging said capacitor to a reference voltage so that said unijunction transistor is rendered conductive at a constant repetition rate whenever said current output is below said predetermined value, and
sensing means operatively connected to said second pair of electrodes responsive to when said current output exceeds said predetermined value to decrease the repetition rate from said constant rate according to the amount said current output exceeds said predetermined value;
the operating frequency of said inverter means being controlled in response to the conduction repetition rate of said unijunction transistor of said relaxation oscillator.

8. The combination of claim 5, wherein:
said chopper circuit including,
a pair of transistors operatively connected in parallel between said direct current source and said inverter means,
a driving source for supplying drive current to said pair of transistors when said current output is below said predetermined value to saturate both of said pair of transistors,
a reference device for providing a signal when said current output exceeds said predetermined value, and
a magnetic amplifier responsive to said signal from said reference device to effect the turn off of said pair of transistors for a given period of time in response to said output current exceeding said predetermined value; and
said oscillator circuit comprising,
a relaxation oscillator including
a unijunction transistor having a plurality of electrodes and operative to provide a conductive path between a first pair of electrodes when the voltage therebetween reaches a predetermined proportion of the voltage between a second pair of electrodes,
a capacitor operatively connected across said first pair of electrodes,
a reference source of potential for charging said capacitor to a reference voltage so that said unijunction transistor is rendered conductive at a constant repetition rate whenever said current output is below said predetermined value,
and sensing means operatively connected to said second pair of electrodes responsive to when said current output exceeds said predetermined value to decrease the repetition rate from said constant rate according to the amount said current output exceeds said predetermined value;
the operating frequency of said inverter means being controlled in response to the conduction repetition rate of said unijunction transistor of said relaxation oscillator.

References Cited

UNITED STATES PATENTS

| | | | |
|---|---|---|---|
| 3,281,631 | 10/1966 | Von Delden et al. | 318—227 |
| 3,320,506 | 5/1967 | Humphrey | 318—231 |
| 3,323,032 | 5/1967 | Agarwal et al. | 318—231 |
| 3,351,835 | 11/1967 | Borden et al. | 318—230 |

JOHN F. COUCH, *Primary Examiner.*

W. H. BEHA, Jr., *Assistant Examiner.*

U.S. Cl. X.R.

318—227, 230, 231; 321—11